United States Patent
Talley et al.

(10) Patent No.: US 8,184,598 B1
(45) Date of Patent: May 22, 2012

(54) LOW-COST INTERNET-BASE-STATION (LCIB) RADIO-FREQUENCY (RF) ADAPTATION USING STATIONARY TRANSCEIVERS

(75) Inventors: Ryan S. Talley, Overland Park, KS (US); Bryan T. Barbee, Olathe, KS (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1025 days.

(21) Appl. No.: 12/129,425

(22) Filed: May 29, 2008

(51) Int. Cl.
*H04B 7/216* (2006.01)

(52) U.S. Cl. ........ 370/335; 370/327; 370/328; 370/329; 370/338; 370/348; 455/443; 455/444; 455/445; 455/446; 455/447; 455/448; 455/449; 455/450; 455/451; 455/452.1; 455/452.2; 455/11.1; 455/13.4; 455/16; 455/41.2; 455/522; 455/69

(58) Field of Classification Search .................. None
See application file for complete search history.

(56) References Cited

U.S. PATENT DOCUMENTS

| | | | |
|---|---|---|---|
| 4,996,715 A | 2/1991 | Marui et al. | |
| 5,634,191 A | 5/1997 | Beasley | |
| 5,767,778 A | 6/1998 | Stone et al. | |
| 5,832,365 A | 11/1998 | Chen et al. | |
| 5,937,332 A | 8/1999 | Karabinis | |
| 6,125,279 A | 9/2000 | Hyziak et al. | |
| 6,141,531 A | 10/2000 | Williams et al. | |
| 6,167,240 A | 12/2000 | Carlsson et al. | |
| 6,219,540 B1 | 4/2001 | Besharat et al. | |
| 6,292,471 B1 * | 9/2001 | Cao et al. | 370/252 |
| 6,404,775 B1 | 6/2002 | Leslie et al. | |
| 6,456,652 B1 | 9/2002 | Kim et al. | |
| 6,493,537 B1 | 12/2002 | Ogawa | |
| 6,507,740 B2 | 1/2003 | Shi | |
| 6,718,180 B1 * | 4/2004 | Lundh et al. | 455/522 |
| 7,035,587 B1 | 4/2006 | Yarkosky | |
| 7,088,959 B2 | 8/2006 | Ho et al. | |
| 7,280,510 B2 | 10/2007 | Lohtia et al. | |
| 7,346,018 B2 * | 3/2008 | Holtzman et al. | 370/311 |
| 7,626,966 B1 * | 12/2009 | Ruiter et al. | 370/337 |
| 7,787,899 B1 | 8/2010 | Talley et al. | |
| 7,813,323 B1 | 10/2010 | Talley et al. | |
| 7,848,238 B1 | 12/2010 | Pawar et al. | |

(Continued)

OTHER PUBLICATIONS

Unpublished U.S. Appl. No. 12/190,567, filed Aug. 12, 2008 entitled "Manually Configuring Low-Cost Internet-Base-Station (LCIB) Coverage Using an Associated Mobile Station".

(Continued)

*Primary Examiner* — Ian N Moore
*Assistant Examiner* — Brian T Le

(57) ABSTRACT

Methods and systems are provided for implementing low-cost Internet-base-station (LCIB) radio-frequency (RF) adaptation using stationary transceivers. In an embodiment, an LCIB emits a pilot beacon having an adjustable transmission-power level. The LCIB repeatedly wirelessly sends transmissions for receipt by each transceiver in a set of one or more stationary transceivers while increasing the power level at which the transmissions are sent. The transceivers are arranged to wirelessly send acknowledgements to the LCIB upon successful receipt of the transmissions. The LCIB receives at least one acknowledgement from a subset of the transceivers, and responsively sets the pilot-beacon transmission-power level equal to an operating value, which the LCIB selects based at least in part on a minimum transmission-sending power level needed to receive an acknowledgement from each transceiver in the subset.

17 Claims, 6 Drawing Sheets

U.S. PATENT DOCUMENTS

| | | | |
|---|---|---|---|
| 2002/0068534 | A1 | 6/2002 | Ue et al. |
| 2003/0119460 | A1 | 6/2003 | Zipper |
| 2003/0171132 | A1* | 9/2003 | Ho et al. ............... 455/522 |
| 2004/0110525 | A1* | 6/2004 | Black et al. ............ 455/522 |
| 2004/0204097 | A1 | 10/2004 | Scheinert et al. |
| 2005/0094616 | A1* | 5/2005 | Sakakura ............... 370/349 |
| 2005/0143118 | A1* | 6/2005 | Bernhardsson et al. ... 455/522 |
| 2005/0148368 | A1 | 7/2005 | Scheinert et al. |
| 2006/0223444 | A1 | 10/2006 | Gross et al. |
| 2007/0042799 | A1 | 2/2007 | Jubin et al. |
| 2007/0054670 | A1 | 3/2007 | Kalika et al. |
| 2007/0094941 | A1 | 5/2007 | Mintie et al. |
| 2007/0165593 | A1 | 7/2007 | Hundal et al. |
| 2008/0188265 | A1 | 8/2008 | Carter et al. |
| 2008/0244148 | A1 | 10/2008 | Nix, Jr. et al. |
| 2008/0305784 | A1 | 12/2008 | Dillinger et al. |
| 2008/0305801 | A1 | 12/2008 | Burgess et al. |
| 2008/0305835 | A1 | 12/2008 | Johnstone et al. |
| 2009/0005043 | A1 | 1/2009 | Claussen et al. |
| 2009/0069033 | A1 | 3/2009 | Karstens et al. |
| 2009/0104912 | A1 | 4/2009 | Foster et al. |
| 2009/0111499 | A1 | 4/2009 | Bosch et al. |
| 2009/0135754 | A1 | 5/2009 | Yavuz et al. |
| 2009/0279519 | A1 | 11/2009 | Brisebois et al. |
| 2010/0048212 | A1 | 2/2010 | Yavuz et al. |
| 2010/0056149 | A1 | 3/2010 | Jubin et al. |
| 2010/0056175 | A1 | 3/2010 | Bachmann et al. |
| 2010/0178907 | A1 | 7/2010 | Oroskar et al. |

OTHER PUBLICATIONS

Non-Final Office Action from U.S. Appl. No. 11/940,159 mailed Feb. 4, 2011.
Notice of Allowance from U.S. Appl. No. 11/854,504 mailed Mar. 2, 2011.
Notice of Allowance from U.S. Appl. No. 12/190,567 mailed Mar. 3, 2011.
Unpublished U.S. Appl. No. 13/029,610, filed Feb. 17, 2011 in the name of Malreddy et al., entitled "Method and System for Management of Inter-frequency Handoff".
Unpublished U.S. Appl. No. 11/854,504, entitled "Mitigating Interference by Low-Cost Internet-Base-Station (LCIB) Pilot Beacons with Macro-Network Communications," filed Sep. 12, 2007 in the name of Talley et al.
Unpublished U.S. Appl. No. 11/854,511, entitled "Call-Detection Algorithm for Mitigating Interference by Low-Cost Internet-Base-Station (LCIB) Pilot Beacons with macro-Network Communications," filed Sep. 12, 2007 in the name of Talley et al.
Unpublished U.S. Appl. No. 11/940,159, entitled "Low-Cost-Internet-Base-Station-(LCIB) User-Adaptation Algorithm," filed Nov. 14, 2007 in the name of Talley et al.
Wan Choi, et al., "Automatic On-Off Switching Repeater for DS/CDMA Reverse Link Capacity Improvement," IEEE Communications Letters, vol. 5, No. 4, Apr. 2001, p. 138-141.
Office Action from U.S. Appl. No. 10/097,415, dated Jun. 21, 2004.
Non-Final Office Action from U.S. Appl. No. 10/222,015, mailed Mar. 24, 2005.
Final Rejection from U.S. Appl. No. 10/222,015, mailed Jul. 29, 2005.
Unpublished U.S. Appl. No. 11/940,159, filed Nov. 14, 2007 entitled "Low-Cost-Internet-BaseStation-(LCIB) User-Adaptation Algorithm".
Unpublished U.S. Appl. No. 12/129,425, filed May 29, 2008 entitled "Low-Cost Internet-BaseStation (LCIB) Radio-Frequency (RF) Adaptation Using Stationary Transceivers".
Notice of Allowance from U.S. Appl. No. 11/854,511 mailed Aug. 24, 2010.
Non-Final Office Action from U.S. Appl. No. 11/854,504 mailed Sep. 28, 2010.
Final Rejection mailed Jun. 22, 2011 for U.S. Appl. No. 11/940,159.
Advisory Action mailed Sep. 7, 2011 for U.S. Appl. No. 11/940,159.

* cited by examiner

LOW-COST INTERNET-BASE-STATION (LCIB) RADIO-FREQUENCY (RF) ADAPTATION USING STATIONARY TRANSCEIVERS

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station operating on a given sector/carrier to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

2. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (e.g. CDMA and EV-DO) are supported), and also transmit what is known as a pilot beacon, which includes administrative messages and parameters that mobile stations use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

SUMMARY

Methods and systems are provided for implementing LCIB RF adaptation using stationary transceivers. In one aspect, an exemplary embodiment may take the form of a method. In accordance with the method, an LCIB emits a pilot beacon having an adjustable pilot-beacon transmission-power level. The LCIB repeatedly wirelessly sends transmissions for receipt by each transceiver in a set of one or more stationary transceivers while increasing from a first value to a second value a power level at which the transmissions are sent.

The transceivers are arranged to wirelessly send acknowledgements to the LCIB upon successful receipt of the transmissions. The LCIB receives at least one acknowledgement from each transceiver in a subset of the set of transceivers, and responsively sets the pilot-beacon transmission-power level equal to an operating value, which the LCIB selects based at least in part on a minimum transmission-sending power level needed to receive an acknowledgement from each transceiver in the subset, wherein the minimum power level is between the first and second values, inclusive.

In another aspect, an exemplary embodiment may take the form of an LCIB programmed to carry out the above-described method. In another aspect, an exemplary embodiment may take the form of a system comprising an LCIB and a set of stationary transceivers, where the LCIB and the transceivers are programmed to together carry out the above-described method.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
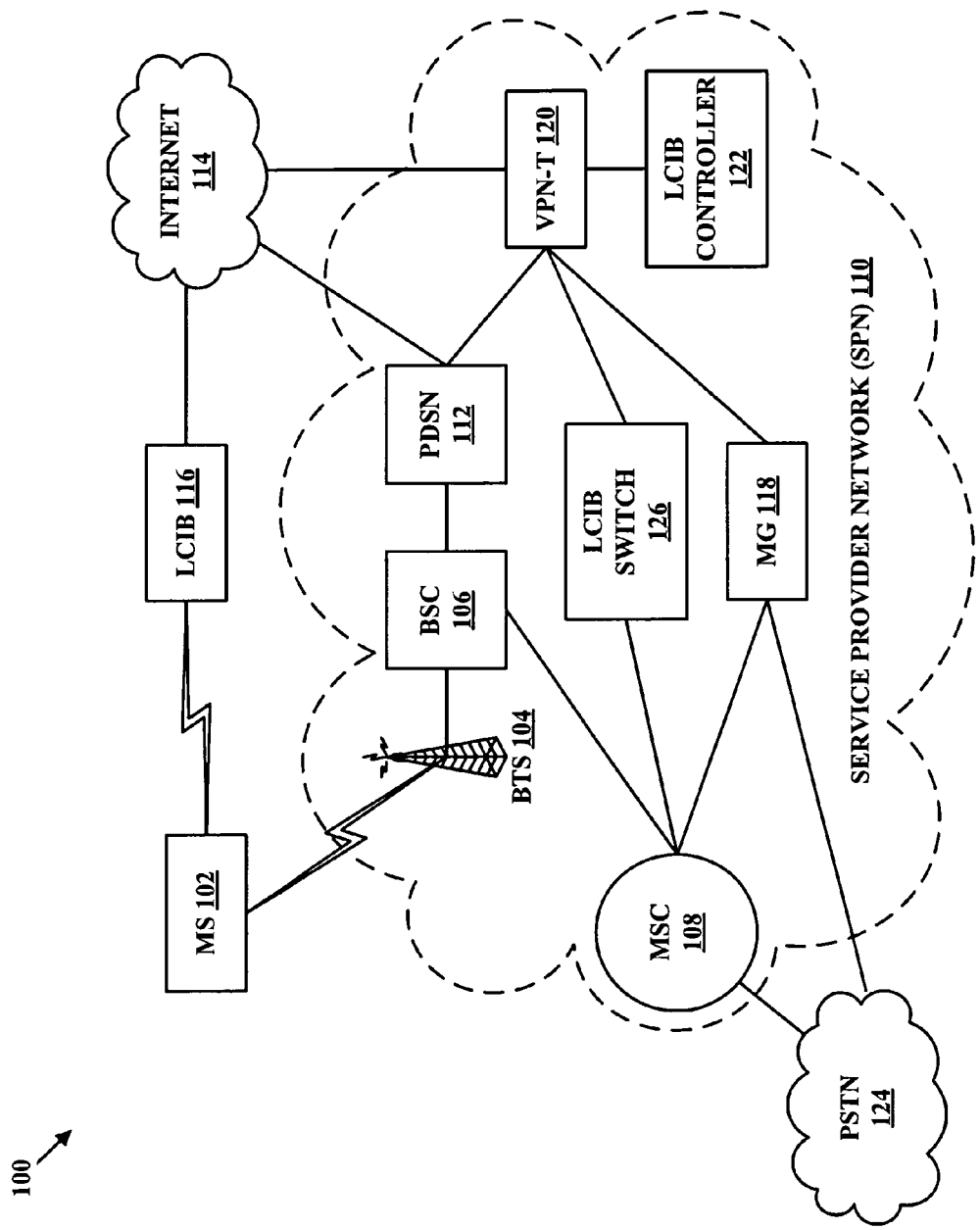
FIG. 1 is a simplified block diagram of a communication system, in accordance with exemplary embodiments.

LCIBs are typically able to operate in what are referred to herein as a restricted mode and a non-restricted mode. In restricted mode, use of (i.e. communication via) the LCIB is restricted to a list of authorized mobile stations. For example, the LCIB may maintain a list of five mobile identification numbers (MINs) that each correspond to a mobile station that is authorized to use the LCIB. Note that this number of mobile stations and manner of identifying them (i.e. by MIN) are examples only, and that the list could also or instead be maintained by one or more network entities in communication with the LCIB. The list could be provided by phone to a customer-service representative that could then send the list via the Internet to the LCIB. Or the user could manage the list via a website. And other examples are possible. In non-restricted mode, any mobile stations in the coverage area of the LCIB can use it.

Upon power-up, restart, or some other command or triggering event, the LCIB may perform a ranging (a.k.a. power-adaptation, transmission-power-adaptation, or RF-adaptation) process, in order to select a transmission-power level for its pilot beacon, which advertises the LCIB's traffic-carrying carrier to nearby mobile stations. In a sense, then, this pilot-beacon transmission power determines the coverage area of the LCIB, which typically transmits its pilot beacon on the one or more macro-network carriers on which the surrounding macro network provides service; if the surrounding macro network provides service on only one carrier, the LCIB will transmit its pilot beacon on that carrier (i.e. the LCIB will transmit a "fixed pilot beacon"); if the surrounding macro network provides service on more than one carrier, the LCIB will repeatedly cycle through transmitting its pilot beacon on some or all of those carriers (i.e. the LCIB will transmit a "frequency-hopping pilot beacon").

In accordance with the above-mentioned ranging process, in non-restricted mode, the LCIB may initially set its pilot-beacon transmission power to a low setting, and then gradually increase the power up to some upper bound, which may or may not be the LCIB's maximum possible transmission power. The LCIB may then set its pilot-beacon transmission power to the highest level (between the low setting and the upper bound, inclusive) at which at least one mobile station registered with the LCIB. That is, the LCIB may set its operating pilot-beacon transmission power to encompass all mobile stations that registered during the ranging process.

In restricted mode, the LCIB may conduct a somewhat similar ranging process, according to which the LCIB initially sets its pilot-beacon transmission power to a low setting, and then gradually increases the power until a mobile station that is not on the authorized list (i.e. an unauthorized mobile station) attempts to register with the LCIB, or until the LCIB reaches some upper-bound power level, whichever comes first. If no authorized mobile stations register with the LCIB during the ranging process, the LCIB may set its pilot-beacon transmission power to a low (e.g. zero) setting, and then periodically retry the ranging process (which it also may do in connection with any of the scenarios described herein).

If one or more authorized mobile stations register—and no unauthorized mobile stations attempt to register—with the LCIB during the ranging process, the LCIB may set its pilot-beacon transmission power to the highest level at which an authorized mobile station registered. If at least one authorized mobile station registers at a first power level—and then an unauthorized mobile station attempts to register at a second, higher power level, the LCIB may set its pilot-beacon transmission power level to the highest level at which an authorized mobile station registered prior to the first unauthorized mobile station trying to register. Note that this is exemplary, and that other algorithms could be used. Note as well that, in the case of a frequency-hopping pilot beacon, in both restricted mode and in non-restricted mode, the LCIB may conduct its ranging process on each carrier on which its pilot beacon hops.

Furthermore, in some embodiments, it may be the case that, in restricted mode, mobile stations that are not on the authorized list are allowed to register with the LCIB (e.g. to add the LCIB's traffic-carrying carrier to their active set); however, when an unauthorized mobile station then attempts to initiate a communication session (e.g. a voice call) via the LCIB, that attempt may be rejected due to the mobile station's unauthorized status.

In general, then, existing implementations of LCIBs use some sort of algorithm for setting their transmission-power level based on communication with one or more mobile stations (i.e. authorized, unauthorized, both, etc.), assuming at least one mobile station is within range of the LCIB at the time. In general, the goal of such an algorithm is to maximize the coverage area of the LCIB without interfering with the macro network. In particular, with respect to one or more such mobile station, the LCIB adapts its transmission power to its RF environment using measurements of macro-network signal strength taken—and reported to the LCIB—by the one or more mobile stations, typically at the time those mobile stations register with the LCIB.

Thus, the fact that a mobile station is registering with (i.e. performing an idle-mode handoff to) the LCIB may indicate to the LCIB that, from the perspective (i.e. at the location) of the mobile station, the LCIB's signal was at least a threshold amount (e.g. 3 dB) stronger than the signal from the macro network. That conclusion—coupled with the actual macro-network-signal-strength data that the mobile station sends to the LCIB in a message such as a pilot strength measurement message (PSMM)—enables the LCIB to determine the power level at which its signal is being received by the mobile station.

The LCIB can then set its transmission power accordingly. That is, the LCIB may set its transmission power only as strong as it needs to be to cause idle-mode handoffs from the macro network to the LCIB. So, if the macro network is particularly strong in the RF environment in which the LCIB has been deployed, the LCIB may set its transmission power to be relatively high. If, conversely, the macro network is particularly weak in the RF environment in which the LCIB has been deployed, the LCIB may set its transmission power to be relatively low. And so on. Incidentally, knowing the macro-network signal strength enables the LCIB to force mobile stations to handoff back to the macro network, by decreasing its transmission power.

However, the approach of the LCIB using mobile-station-gathered macro-network-signal-strength data to set its transmission power does not always produce consistent and reliable results. For one, the fact that mobile stations inherently have variable locations introduces variability. In addition, when the LCIB device is powered up, it may be the case that no mobile stations are available to assist the LCIB in performing its transmission-power-adaptation algorithm, which may mean that the LCIB will dial its power all the way down or even off, making it unavailable to approaching mobile stations for some period of time. And there are other drawbacks as well to current implementations, in addition to those noted herein.

According to the invention, several (e.g. four) stationary transceivers are deployed (e.g. in power outlets) around the perimeter of the location (e.g. home or office) in which the LCIB is deployed, each operable to wirelessly communicate with the LCIB. When the LCIB performs its power-adaptation process, it may emit transmissions (e.g. signals and/or messages) for receipt by the transceivers, starting off at a low transmission power, and incrementally increasing the transmission power until (a) all of the transceivers acknowledge the LCIB by return transmission or (b) a maximum transmission power is reached, whichever occurs first. Thus, among other advantages of the present invention, the LCIB can configure its pilot-beacon transmission power to cover approximately the correct physical space even if no mobile stations are nearby.

As part of this process, the LCIB and each respective transceiver may exchange messages containing specific information; for example, upon successful receipt of a particular message from the LCIB, each transceiver may send an acknowledgement message to the LCIB, perhaps indicating power and signal-quality measurements with respect to the LCIB's transmissions. In other embodiments, the LCIB may simply emit a signal on a first channel; upon detection of that signal, a given transceiver may emit a signal on a second channel. And other possibilities exist with respect to an LCIB seeking and receiving acknowledgement from a plurality of stationary transceivers, without departing from the invention.

Upon receiving acknowledgement from each transceiver, the LCIB may then set its transmission power based on the power levels needed to communicate with the transceivers. For example, the LCIB may set its power level to the lowest level at which it was able to reach all of the transceivers during the adaptation process. In some embodiments, the LCIB may account for one or more transceivers being unreachable, perhaps by setting its transmission power based only on the transceivers that are reachable. In some embodiments, the LCIB may allow at most a threshold power delta between successive transceivers when ordered according to transmission power needed to communicate with them, and omit outlying transceivers when setting its transmission-power level, perhaps to thwart efforts to expand the coverage area of the LCIB using an outlying transceiver (that, for example, has been placed in a neighboring residence).

With respect to the format of the wireless communication between the LCIB and each transceiver, it could be according to any wireless scheme(s) or protocol(s) that both the LCIB and the transceivers understand, and may differ from whatever wireless protocol is used for communication between the LCIB and one or more mobile stations. For example, the LCIB may function in general to provide 1×RTT CDMA service to one or more mobile stations; in that example, the LCIB may or may not use CDMA communication for communicating with each transceiver. Nor is it necessary that the LCIB use the same wireless form of communication between it and every transceiver, though it likely would.

In general, the LCIB may communicate with each transceiver using any protocol, modulation, coding scheme, frequency, and messaging structure. Some possibilities include using CDMA, WiFi (IEEE 802.11), infrared, Bluetooth, simple RF (e.g. an analog RF transmission of a simple bit string). Note that it may be necessary, in the case of providing service according to one protocol (e.g. 1×RTT CDMA) and communicating with the stationary transceivers according to another (e.g. simple RF) to implement a conversion table or function between power levels on different wireless protocols or due to different modulation and coding schemes (as different types of signals are often harder or easier to decode at various power levels than others). Preferably, the LCIB provides service to mobile stations and communicates with the transceivers in the same frequency range, even if not according to the same protocol.

In exemplary embodiments, a given LCIB would have a one-to-one association with each of several stationary transceivers. A given transceiver may be associated with the LCIB in any number of ways. One such way would be to provide user interfaces (e.g. buttons) on each that, when pressed, would cause an association to be made, perhaps similar to the manner in which Bluetooth devices are associated with each other, or perhaps similar to the manner in which wireless keyboards and mice are associated with a USB-connected transceiver, or perhaps in some other manner. In some embodiments, predefined pseudorandom rolling codes may be employed for authentication between the LCIB and each stationary transceiver, perhaps similar to the manner in which a garage-door opener is associated with one or more remote controls. In other embodiments, a user may log into a webpage on the LCIB or on some other server, and then enter in unique identifiers (e.g. serial numbers, MAC addresses) of transceivers. And other methods of association, such as infrared communication, associations originally manufactured into the devices, bar-code scanning, and/or any others may be used as well.

And it should be noted that the above overview is illustrative and not limiting. That is, additional and/or different features may be present in some embodiments of the present invention. It should be noted as well that any description of an LCIB and/or a macro network providing service according to CDMA, and any description of particular wireless modes of communication between the LCIB and one or more transceivers are examples; any suitable modes (e.g. protocols) may be used instead, such as EV-DO, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, a public switched telephone network (PSTN) 124, and an LCIB switch 126. And additional entities could be present as well, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, MG 118, LCIB switch 126, and PSTN 124. In general, MSC 108 acts as a switch between (a) PSTN 124 and (b)(i) one or more BSCs such as BSC 106 and (ii) one or more LCIB switches such as LCIB switch 126, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106, VPN terminator 120, and Internet 114. In general, PDSN 112 acts as a network access server between (a) Internet 114 and (b)(i) BSCs such as BSC 106 and (ii) VPN terminators such as VPN terminator 120, facilitating packet-data communication between mobile stations and Internet 114, via macro base stations and LCIBs.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include (a) a wireless interface for communicating with (i) one or more mobile stations according to a protocol such as CDMA (and/or one or more other technologies) and (ii) one or more stationary transceivers according to a wireless-communication mode such as simple RF (and/or one or more other technologies), as well as (b) an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. In operation, MG 118 may (a) receive packet-based communications from entities on SPN 110, convert those to circuit-switched communications, and pass them to MSC 108 and/or PSTN 124 and (b) receive circuit-switched communications from MSC 108 and/or PSTN 124, convert those to packet-based communications, and pass them to entities on SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least MG 118, LCIB controller 122, LCIB switch 126, and Internet 114. In general, VPN terminator 120 functions to establish secure VPN connections over Internet 114 with LCIBs such as LCIB 116, enabling the LCIBs to securely communicate with devices on SPN 110 and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on SPN 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

LCIB switch 126 may be any networking element arranged to carry out the LCIB-switch functions described herein. As such, LCIB switch 126 may include a communication interface, a processor, and data storage comprising instructions executable by the processor for carrying out those LCIB-switch functions. The communication interface may include one or more wired and/or wireless interfaces for communicating with at least MSC 108 and VPN terminator 120. In general, LCIB switch 126 acts as a switch between MSC 108 and VPN terminator 120, enabling mobile stations communicating via LCIBs to engage in calls over PSTN 124 via MSC 108.

b. An Exemplary LCIB

Figure 2:
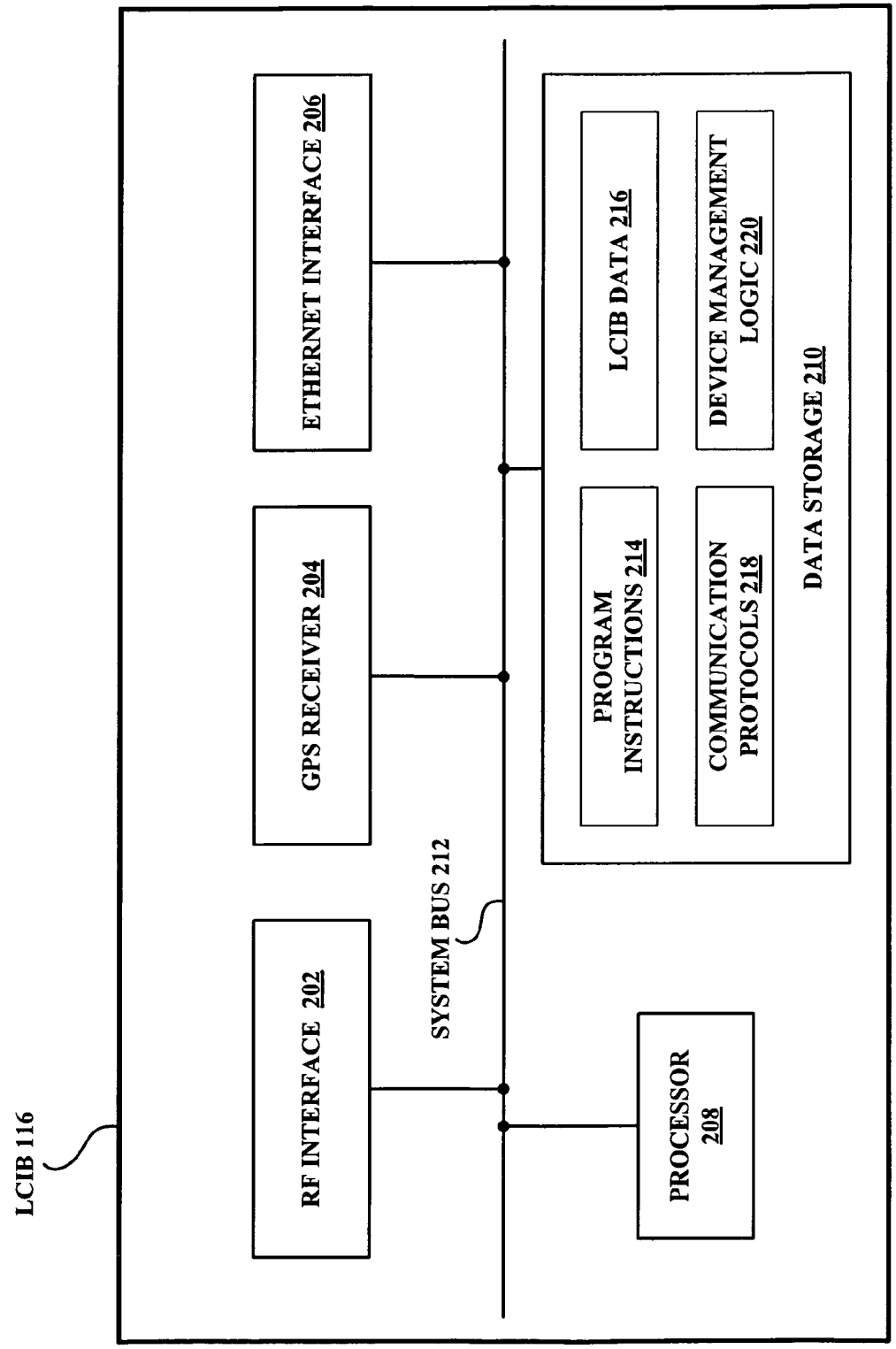
FIG. 2 is a simplified block diagram of a low-cost Internet base station (LCIB), in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for (a) providing a wireless coverage area according to a wireless-communication protocol such as CDMA (and/or one or more other technologies) and (b) communicating with one or more stationary transceivers, as described herein. GPS receiver 204 may be any known or hereafter-developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

c. Exemplary Scenarios

Figure 3A:
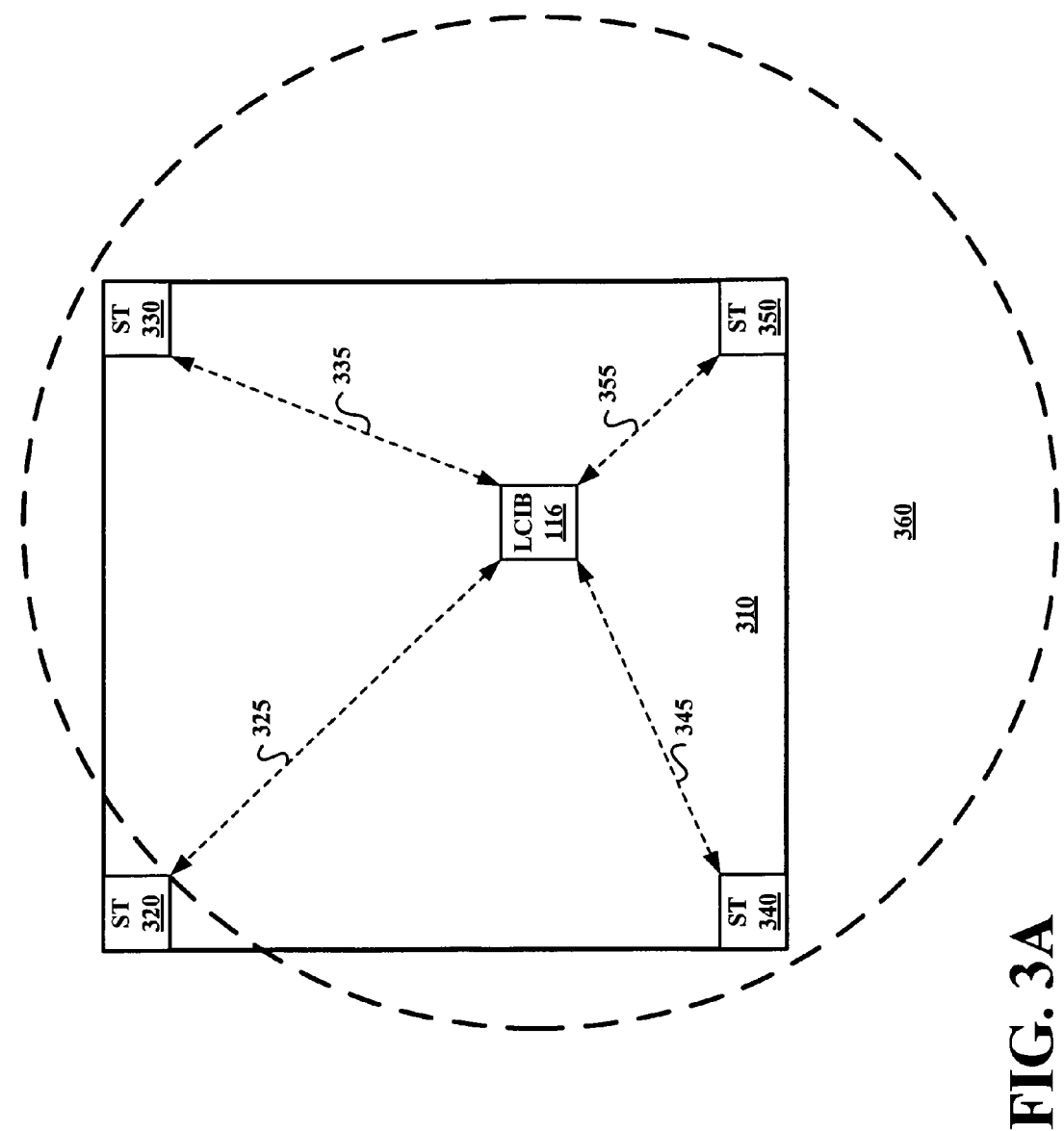
FIGS. 3A and 3B depict arrangements of communication entities, in accordance with exemplary embodiments.
Figure 3B:
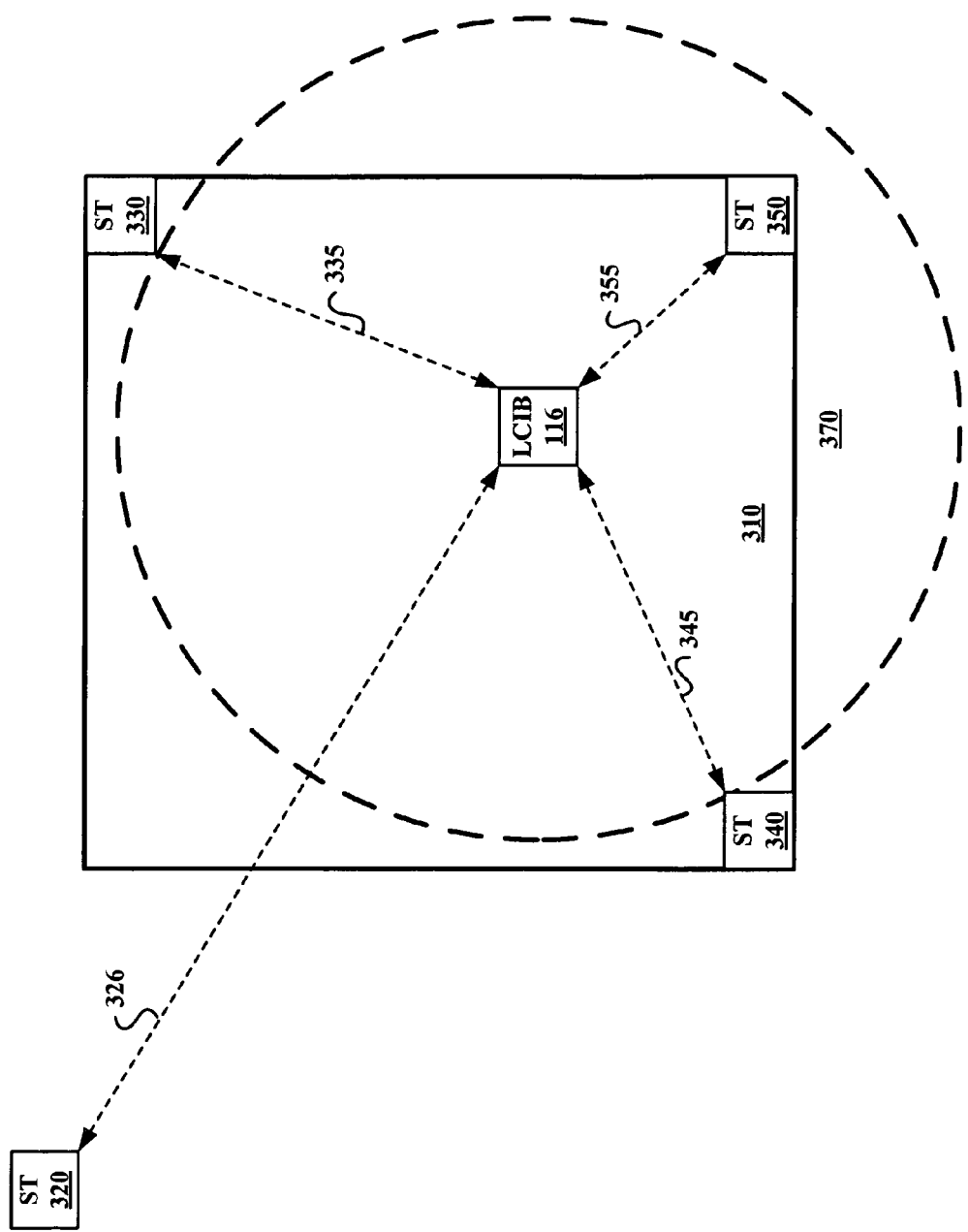

FIGS. 3A and 3B depict exemplary scenarios that may occur in connection with carrying out embodiments of the invention. FIG. 3A depicts an overhead view of a location (e.g. a house, apartment, office, piece of property, etc.) 310. Note that the square shape of location 310 is provided as a simple example, and that any location having any shape could be used in accordance with embodiments of the invention. LCIB 116 is depicted as being located slightly to the right of and below a center point of location 310, though LCIB 116 could be located in any suitable position. Furthermore, stationary transceivers (ST) 320, 330, 340, and 350 are shown as being respectively deployed in the four corners of location 310, though any number and arrangement of stationary transceivers could just as well be used.

The dotted bi-directional arrows 325, 335, 345, and 355 are shown respectively extending from LCIB 116 to transceivers 320, 330, 340, and 355. These arrows indicate bi-directional wireless communication, and could also be interpreted as being distances from LCIB 116 to the respective stationary transceivers. Each of these transceivers may be deployed in a power outlet near the perimeter of location 310. FIG. 3A also depicts a coverage area 360 of LCIB 116, set according to the methods and systems described herein.

Note that, in the example of FIG. 3A, coverage area 360 just barely reaches transceiver 320, which is the furthest of the four from LCIB 116. As a result, the substantially circular coverage area 360 of LCIB 116 extends to varying degrees beyond the locations of the other three transceivers 330, 340, and 350. FIG. 3A may depict a scenario in which all four transceivers are appropriately deployed along the perimeter of location 310, and in which all four are reachable by LCIB 116 for the purpose of setting the transmission-power level that determines the radius of coverage area 360.

FIG. 3B depicts a scenario that is similar in many aspects to the scenario depicted in FIG. 3A. In FIG. 3B, however, transceiver 320 has been deployed in an outlying position, resulting in a communication link 326 between transceiver 320 and LCIB 116 that has a much greater distance than the communication link 325 in FIG. 3A. FIG. 3B may depict a scenario in which a user attempts to increase the coverage area of LCIB 116 by plugging transceiver 320 into a power outlet in a neighboring house or apartment.

In accordance with some embodiments of the present invention, including the one depicted in FIG. 3B, LCIB 116 determines that the delta between the power needed to reach transceiver 330 and the power needed to reach transceiver 320 is too great (e.g. greater than a threshold amount), and responsively sets its transmission power based on transceivers 330, 340, and 350. Thus, it can be seen in FIG. 3B that the coverage area 370 of LCIB 116 barely reaches transceiver 330, and extends to varying degrees beyond transceivers 340 and 350. And many other examples such as this are possible as well, all falling within the scope and spirit of the present invention.

d. Exemplary Stationary Transceiver

Figure 4:
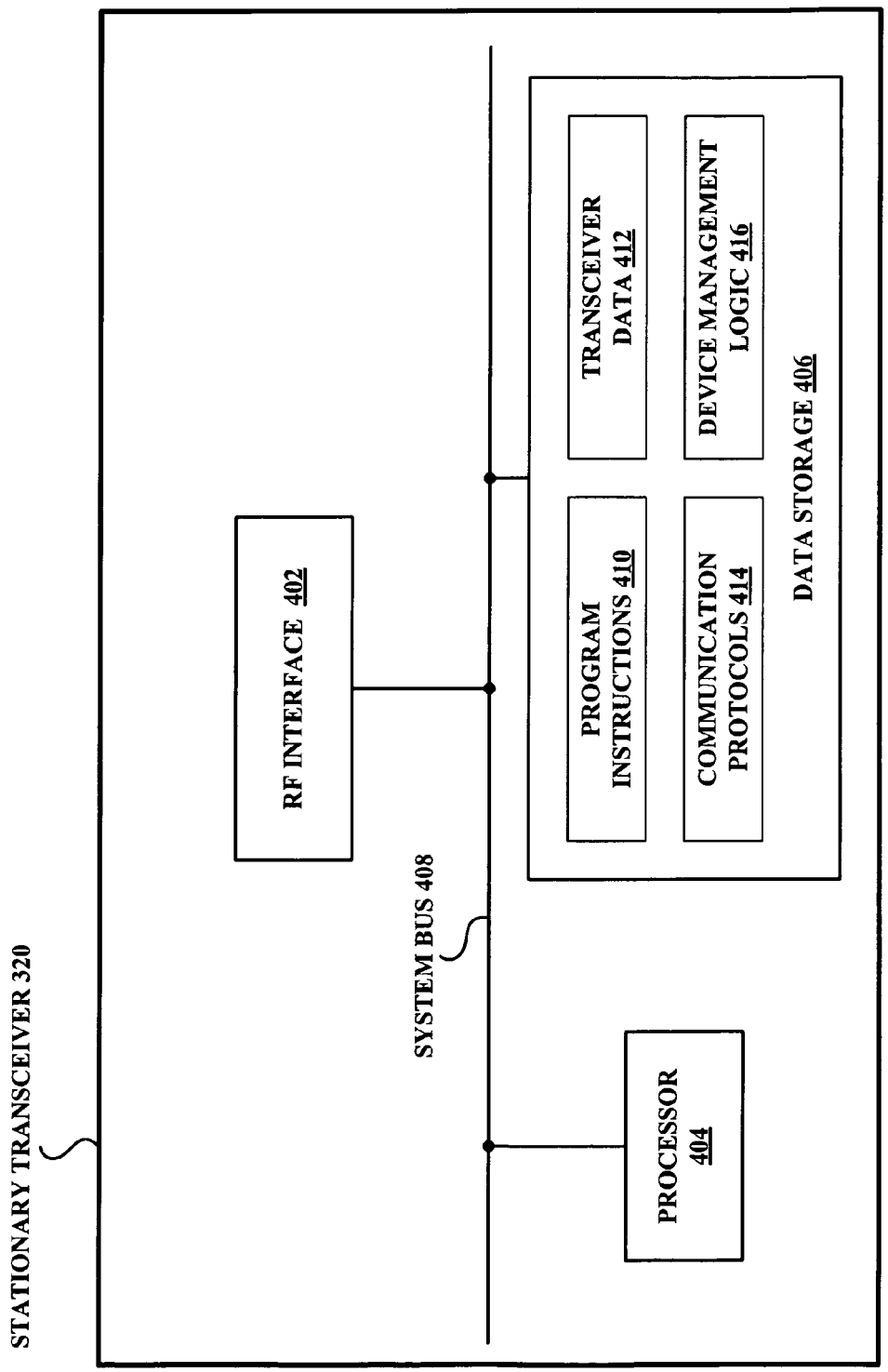
FIG. 4 is a simplified block diagram of a stationary transceiver, in accordance with exemplary embodiments.

FIG. 4 depicts an exemplary diagram of stationary transceiver 320, which includes an RF interface 402, a processor 404, and data storage 406, all communicatively linked by a system bus 408. Note that transceiver 320 could have additional and/or different components, and that this structure is provided by way of example. Moreover, transceivers 330, 340, and 350 may have a structure similar or identical to the structure depicted in FIG. 4, though one or more of those transceivers may have a different structure, as may transceiver 320. RF interface 402 may include one or more antennas, one or more chipsets, a set of one or more channel elements, and/or one or more other components suitable for wirelessly communicating with LCIB 116, as described herein. Processor 404 may comprise multiple (e.g., parallel) processors, such as a general purpose microprocessor and/or a discrete digital signal processor.

The data storage 406 may take various forms, in one or more parts, such as a non-volatile storage block and/or a removable storage medium, and may include (a) program instructions 410 executable by processor 404 for carrying out the stationary-transceiver functions described herein, (b) transceiver data 412, which may be any operational data or other type of data stored for use by stationary transceiver 320, (c) communication protocols 414, facilitating and enabling communication with one or more other devices, and (d) device management logic 416, perhaps for memory and file management. And stationary transceiver 320 may have one or more user interface elements (not depicted) as well, such as one or more buttons and/or one or more display elements (e.g. one or more LEDs for indicating various states).

3. Exemplary Operation

Figure 5:
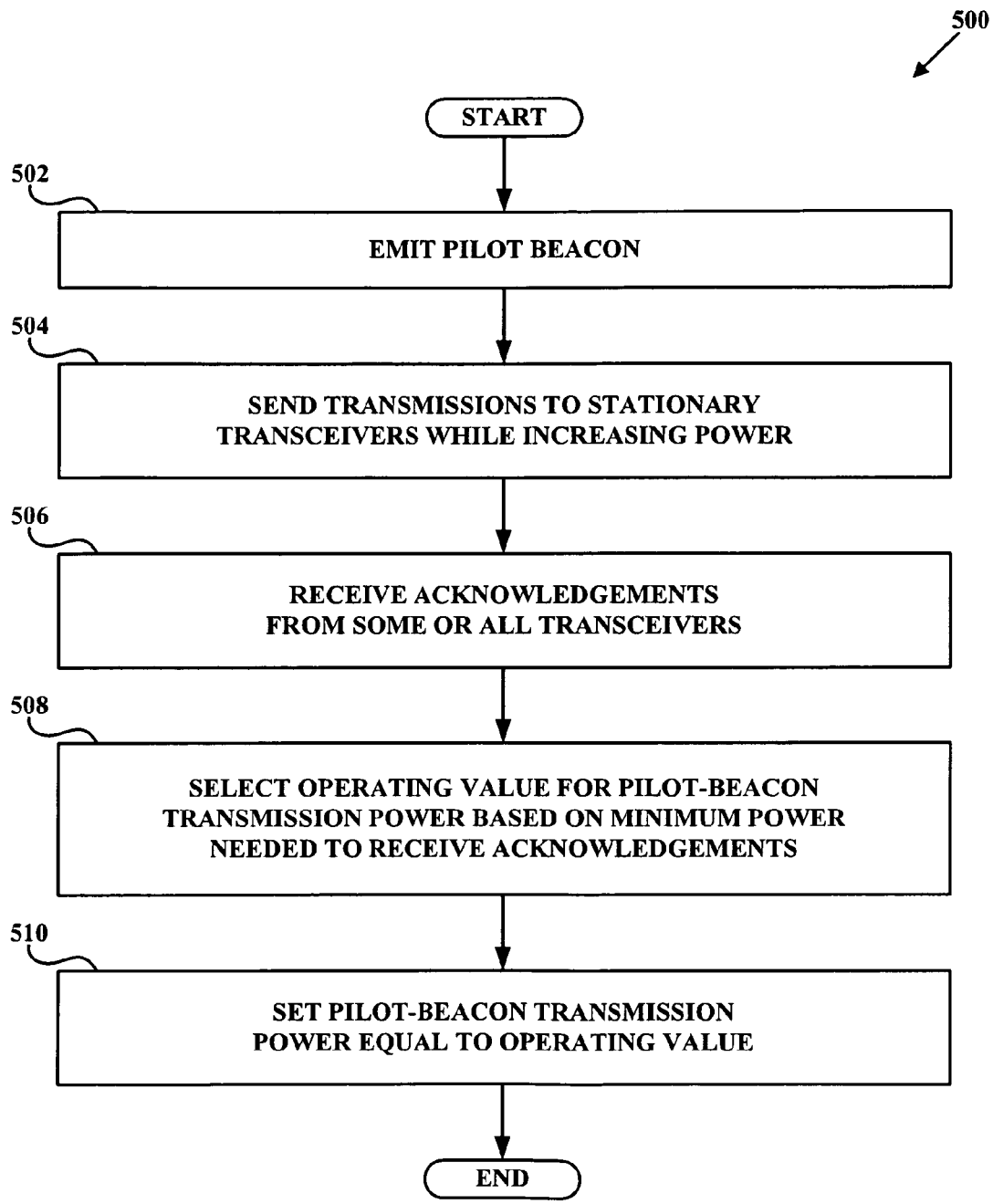
FIG. 5 depicts a method, in accordance with exemplary embodiments.

FIG. 5 depicts a flowchart of an exemplary method 500, in accordance with an exemplary embodiment. As shown in FIG. 5, method 500 begins at step 502, when LCIB 116 emits a pilot beacon, where the pilot beacon has an adjustable pilot-beacon transmission-power level. At step 504, LCIB 116 repeatedly wirelessly sends transmissions for receipt by each transceiver in a set of one or more stationary transceivers while increasing from a first value to a second value the power level at which the transmissions are sent. The transceivers are arranged to wirelessly send acknowledgements to LCIB 116 upon successful receipt of the transmissions.

At step 506, LCIB 116 receives at least one acknowledgement from each transceiver in a subset of the set of transceivers. At step 508, LCIB 116 selects an operating value for it pilot-beacon transmission-power level, based at least in part on a minimum transmission-sending power level needed to receive an acknowledgement from each transceiver in the subset. The minimum power level is between the first and second values, inclusive. At step 510, LCIB 116 sets the pilot-beacon transmission-power level equal to the operating value.

These steps are further explained in the following subsections. And it should be noted that, although method 500 is described as being carried out by LCIB 116, this is not required. In some embodiments, method 500 may be carried out by LCIB 116 in cooperation with one or more other entities, such as one or more stationary transceivers. In general, method 500 could be carried out by any one or any combination of the network elements described herein, or any other network element(s).

i. Emit Pilot Beacon

At step 502, LCIB 116 emits a pilot beacon, which has an adjustable pilot-beacon transmission-power level. In some embodiments, LCIB 116 may emit a fixed pilot beacon (on a single macro-network carrier). In other embodiments, LCIB 116 may emit a frequency-hopping pilot beacon on a set of macro-network carriers, in which case method 500 may be carried out with respect to each such macro-network carrier. Note that LCIB 116 may provide service on a traffic-carrying carrier, and the pilot beacon may comprise information usable by mobile stations for handing off to the traffic-carrying carrier, typically from the macro network.

ii. Send Transmissions to Stationary Transceivers while Increasing Power

At step 504, LCIB 116 repeatedly wirelessly sends transmissions for receipt by each transceiver in a set of one or more stationary transceivers (such as transceivers 320, 330, 340, and 350) while increasing from a first value to a second value the power level at which the transmissions are sent. As an example, the first value may be a low or even zero power setting, while the second value may be a maximum value at which LCIB 116 can or is configured to send transmissions to the transceivers. The second value may instead correspond to a power value at which LCIB 116 is able to reach—i.e. receive acknowledgements from—all stationary transceivers that LCIB is associated with. Correspondingly, the transceivers are arranged to wirelessly send acknowledgements to LCIB 116 upon successful receipt of the transmissions.

As stated herein, LCIB 116 may provide service to mobile stations according to a first wireless protocol (such as 1×RTT CDMA); in some embodiments, LCIB 116 communicates with the stationary transceivers using the same protocol that it uses to provide service to mobile stations. In other embodiments, LCIB 116 may communicate with the stationary transceivers according to a protocol different from the one it uses to provide service to mobile stations. Some example protocols that LCIB 116 may use for communication with the stationary transceivers are WiFi (IEEE 802.11), simple RF, and Bluetooth. In the simple RF example, LCIB 116 may send out a signal, message, code, or other information on an RF channel, and monitor for acknowledgements from the transceivers on that RF channel or a different one.

In general, each transmission sent by LCIB 116 for receipt and acknowledgement by the stationary transceivers may comprise a probe message, and each acknowledgement sent from a stationary transceiver to LCIB 116 may comprise an acknowledgement message. And each acknowledgement may indicate at least one of the received power and signal quality with respect to the transmissions sent by LCIB 116. Furthermore, the stationary transceivers may be deployed in power outlets around a perimeter of the location in which LCIB 116 is deployed.

iii. Receive Acknowledgements from Some or All Transceivers

At step 506, LCIB 116 receives at least one acknowledgement from each transceiver in a subset of the set of transceivers. In some cases, that subset equals the set; that is, in some cases, LCIB 116 will successfully receive acknowledgements from all transceivers that have been deployed in connection with that LCIB. A group of transceivers may have been associated with LCIB 116, perhaps using one of the association processes described herein (i.e. Bluetooth association, use of buttons on LCIB 116 and each transceiver, a pseudorandom-rolling-code approach, infrared communication, manual data entry of serial numbers and/or MAC addresses, etc.). And LCIB 116 may successfully receive acknowledgements from all of these transceivers. In that case, the second value described above (i.e. the upper bound for the transmission-sending power value) may be the minimum transmission-sending power level needed to receive an acknowledgement from each transceiver in the subset.

In other embodiments, LCIB 116 may receive acknowledgements from some but not all of the transceivers associated with the LCIB; that is, the subset referenced above may be a proper subset (i.e. some but not all) of the set. In that case, LCIB 116 may set its pilot-beacon transmission-power level based on the transceivers from which the LCIB does receive at least one acknowledgment.

In other embodiments, the subset of transceivers on which LCIB 116 will base its determination of its pilot-beacon transmission power will be the subset consisting of all transceivers in the set for which a transmission-power delta does not exceed a threshold when ordering the transceivers in the subset by transmission-sending power needed to receive an acknowledgement from them. That is, LCIB 116 may sort the transceivers from least to greatest with respect to the transmission-sending power level needed to elicit at least one acknowledgement, and then exclude from later consideration any transceiver for which the delta from the power needed to reach the previous transceiver to that one exceeds a threshold. And naturally, LCIB 116 would also exclude all transceivers that come after the offending transceiver in that sorted list, as those would be outliers as well.

iv. Select Pilot-Beacon Transmission Power Based on Minimum Transmission-Sending Power Needed to Receive Acknowledgements At step 508, LCIB 116 selects an operating value for its pilot-beacon transmission-power level based at least in part on a minimum transmission-sending power level needed to receive an acknowledgement from each transceiver in the subset. Thus, whether the subset being used by LCIB 116 in step 508 is all transceivers with which it is associated, only those that respond while LCIB 116 is increasing the transmission-sending power level from the first value to the second value, or all transceivers that respond minus those that violate the power-delta criterion described above, the minimum transmission-sending power needed to get an acknowledgement back from each transceiver in the relevant subset will be between the first and second values, inclusive.

In the case where LCIB 116 provides service using one protocol and communicates with the stationary transceivers using another, LCIB 116 may need to use a conversion table or a function to derive the operating value from the minimum transmission-sending value needed to reach all transceivers in the subset. If, however, LCIB 116 provides service to mobile stations and communicates with the stationary transceivers using the same protocol (e.g. CDMA), the LCIB 116 may simply select its operating value to be equal the minimum transmission-sending value needed to reach all transceivers in the subset.

v. Set Pilot-Beacon Transmission Power Equal to Selected Value

At step 510, LCIB 116 sets its pilot-beacon transmission-power level equal to the operating value selected in step 508. Note that LCIB 116 carries out steps 508 and 510 in response to receiving the acknowledgements in step 506. LCIB 116 then operates using that pilot-beacon transmission-power level until the next time it carries out its RF-adaptation process, or until it changes its pilot-beacon transmission-power level for some other reason. Note that LCIB 116 may carry out method 500 periodically, or perhaps in response to some trigger such as a user command, being reset, being powered on, etc.

4. Conclusion

Various exemplary embodiments have been described above. Those skilled in the art will understand, however, that changes and modifications may be made to those examples without departing from the scope of the claims.

What is claimed is:

1. A method comprising:
    emitting by a low-cost Internet base station (LCIB) a pilot beacon that has an adjustable pilot-beacon transmission-power level;
    repeatedly wirelessly sending by the LCIB transmissions for receipt by each transceiver in a set of multiple stationary transceivers while increasing from a first value to a second value a transmission-sending power level at which the transmissions are sent, wherein the transceivers are arranged to wirelessly send acknowledgements to the LCIB upon successful receipt of the transmissions;
    receiving by the LCIB at least one acknowledgement from each transceiver in a subset of the set of transceivers, the subset consisting of some or all of the transceivers in the set of transceivers;
    sorting by the LCIB the transceivers in the subset in an ascending order of transmission-sending power needed to elicit at least one acknowledgement from the respective transceiver;
    identifying by the LCIB, when proceeding from transceiver to transceiver in the ascending order and from the beginning thereof, a first occurrence of a delta between the respective transmission-sending powers needed to elicit at least one acknowledgement from a first transceiver and a second transceiver listed consecutively in the ascending order exceeding a threshold power delta, and responsively modifying by the LCIB the subset by removing from the subset the second transceiver and any one or more additional transceivers appearing after the second transceiver in the ascending order;
    after the modifying of the subset, selecting by the LCIB an operating value based at least in part on a minimum transmission-sending power level needed to receive an acknowledgement from each transceiver in the subset, wherein the minimum transmission-sending power level is between the first and second values, inclusive; and
    setting by the LCIB the pilot-beacon transmission-power level equal to the selected operating value.

2. The method of claim 1, wherein emitting the pilot beacon comprises emitting the pilot beacon on a macro-network carrier.

3. The method of claim 1, wherein emitting the pilot beacon comprises emitting a frequency-hopping pilot beacon on a set of macro-network carriers, the method carried out with respect to each macro-network carrier in the set of macro-network carriers.

4. The method of claim 1, wherein the LCIB provides service on a traffic-carrying carrier, wherein the pilot beacon comprises information usable by mobile stations for handing off to the traffic-carrying carrier.

5. The method of claim 1, further comprising the LCIB providing service to mobile stations according to a first wireless protocol, wherein the LCIB sends the transmissions to and receives the acknowledgements from the transceivers according to the first wireless protocol.

6. The method of claim 5, wherein the first wireless protocol is a code division multiple access (CDMA) protocol.

7. The method of claim 1, further comprising the LCIB providing service to mobile stations according to a first wireless protocol, wherein the LCIB sends the transmissions to and receives the acknowledgements from the transceivers according to a second wireless protocol different from the first wireless protocol.

8. The method of claim 7, wherein the first wireless protocol is a code division multiple access (CDMA) protocol, and wherein the second wireless protocol is selected from the group consisting of WiFi, simple radio frequency (RF), and Bluetooth.

9. The method of claim 1, wherein each transmission comprises a probe message, and wherein each acknowledgement comprises an acknowledgement message.

10. The method of claim 1, further comprising associating a plurality of transceivers with the LCIB, wherein the set of transceivers consists of the plurality of transceivers.

11. The method of claim 1, wherein the second value is the minimum transmission-sending power level needed to receive an acknowledgement from each transceiver in the subset.

12. The method of claim 1, wherein the second value is a maximum transmission-sending power level at which the LCIB is arranged to be able to send the transmissions for receipt by the transceivers.

13. The method of claim 1, wherein selecting the operating value based at least in part on the minimum transmission-sending power level needed to receive an acknowledgement from each transceiver in the subset comprises deriving the operating value from the minimum transmission-sending power level using at least one of a conversion table and a function.

14. The method of claim 1, further comprising deploying the LCIB in a location, and deploying the transceivers in power outlets around a perimeter of the location.

15. The method of claim 1, wherein each acknowledgement indicates at least one of received power and signal quality with respect to the transmissions sent by the LCIB.

16. A low-cost Internet base station (LCIB) comprising:
    a communication interface;
    a processor; and
    data storage comprising instructions executable by the processor for causing the LCIB to carry out functions including:
        emitting a pilot beacon that has an adjustable pilot-beacon transmission-power level;
        repeatedly wirelessly sending transmissions for receipt by each transceiver in a set of multiple stationary transceivers while increasing from a first value to a second value a transmission-sending power level at which the transmissions are sent, wherein the transceivers are arranged to wirelessly send acknowledgements to the LCIB upon successful receipt of the transmissions;

receiving at least one acknowledgement from each transceiver in a subset of the set of transceivers, the subset consisting of some or all of the transceivers in the set of transceivers;

sorting the transceivers in the subset in an ascending order of transmission-sending power needed to elicit at least one acknowledgement from the respective transceiver;

identifying, when proceeding from transceiver to transceiver in the ascending order and from the beginning thereof, a first occurrence of a delta between the respective transmission-sending powers needed to elicit at least one acknowledgement from a first transceiver and a second transceiver listed consecutively in the ascending order exceeding a threshold power delta, and responsively modifying the subset by removing from the subset the second transceiver and any one or more additional transceivers appearing after the second transceiver in the ascending order;

after the modifying of the subset, selecting an operating value based at least in part on a minimum transmission-sending power level needed to receive an acknowledgement from each transceiver in the subset, wherein the minimum transmission-sending power level is between the first and second values, inclusive; and setting the pilot-beacon transmission-power level equal to the selected operating value.

17. A system comprising:

(i) a low-cost Internet base station (LCIB) programmed to carry out functions including:

emitting a pilot beacon that has an adjustable pilot-beacon transmission-power level, repeatedly wirelessly sending transmissions for receipt by each transceiver in a set of multiple stationary transceivers while increasing from a first value to a second value a transmission-sending power level at which the transmissions are sent, receiving at least one acknowledgement from each transceiver in a subset of the set of transceivers, the subset consisting of some or all of the transceivers in the set of transceivers;

sorting the transceivers in the subset in an ascending order of transmission-sending power needed to elicit at least one acknowledgement from the respective transceiver;

identifying, when proceeding from transceiver to transceiver in the ascending order and from the beginning thereof, a first occurrence of a delta between the respective transmission-sending powers needed to elicit at least one acknowledgement from a first transceiver and a second transceiver listed consecutively in the ascending order exceeding a threshold power delta, and responsively modifying the subset by removing from the subset the second transceiver and any one or more additional transceivers appearing after the second transceiver in the ascending order;

after the modifying of the subset, selecting an operating value based at least in part on a minimum transmission-sending power level needed to receive an acknowledgement from each transceiver in the subset, wherein the minimum transmission-sending power level is between the first and second values, inclusive; and (ii) the set of stationary transceivers, each programmed to carry out functions including wirelessly sending acknowledgements to the LCIB upon successful receipt of the transmissions.

\* \* \* \* \*